US010769204B2

(12) United States Patent
Vergin et al.

(10) Patent No.: US 10,769,204 B2
(45) Date of Patent: Sep. 8, 2020

(54) SYSTEM AND METHOD FOR UNSUPERVISED DISCOVERY OF SIMILAR AUDIO EVENTS

(71) Applicant: Genesys Telecommunications Laboratories, Inc., Daly City, CA (US)

(72) Inventors: Rivarol Vergin, Indianapolis, IN (US); Jason Anthony McDowell, Indianapolis, IN (US); Emma Ehrhardt, Indianapolis, IN (US); Adam Paugh, Indianapolis, IN (US)

(*) Notice: Subject to any disclaimer, the term of this patent is extended or adjusted under 35 U.S.C. 154(b) by 0 days.

(21) Appl. No.: 16/736,901

(22) Filed: Jan. 8, 2020

(65) Prior Publication Data

US 2020/0218759 A1 Jul. 9, 2020

Related U.S. Application Data

(60) Provisional application No. 62/789,860, filed on Jan. 8, 2019.

(51) Int. Cl.
*G06F 16/65* (2019.01)
*G06F 16/22* (2019.01)
*G06F 16/61* (2019.01)

(52) U.S. Cl.
CPC .......... *G06F 16/65* (2019.01); *G06F 16/2255* (2019.01); *G06F 16/2272* (2019.01); *G06F 16/61* (2019.01)

(58) Field of Classification Search
CPC .. G06F 16/65; G06F 16/2272; G06F 16/2255; G06F 16/61
See application file for complete search history.

(56) References Cited

U.S. PATENT DOCUMENTS

| 5,007,000 A * | 4/1991 | Baldi .................. H04M 1/82 |
| | | 379/32.04 |
| 10,134,051 B1 * | 11/2018 | Mueller ............. G06Q 30/0207 |
| 2007/0129946 A1 * | 6/2007 | Ma ...................... G10L 13/027 |
| | | 704/256 |
| 2008/0040110 A1 * | 2/2008 | Pereg ...................... G10L 17/26 |
| | | 704/236 |
| 2010/0070509 A1 * | 3/2010 | Li ............................ G06F 16/41 |
| | | 707/747 |
| 2011/0173185 A1 * | 7/2011 | Vogel .................... G06F 16/683 |
| | | 707/722 |
| 2012/0095764 A1 * | 4/2012 | Jeon .................... G10L 15/1822 |
| | | 704/246 |

(Continued)

OTHER PUBLICATIONS

Haitsma, J., Kalker, T. and Oostveen, J., Robust Audio Hashing for Content Identification, Content Based Multimedia Indexing, Brescia, Italy, 2001.

(Continued)

*Primary Examiner* — Fan S Tsang
*Assistant Examiner* — David Siegel

(57) ABSTRACT

A system and method are presented for unsupervised discovery of similar audio events collected from an automated dialing campaign. Locality Sensitive Hashing (LSH) is used to search for similar audio clips within a large dataset of audio recordings. A database is queried for possible matches between an unknown audio clip and any reference carrier audio message present in the database. The database is updated when new, or changed, carrier audio messages are detected.

18 Claims, 4 Drawing Sheets

(56) References Cited

U.S. PATENT DOCUMENTS

2014/0257820 A1* 9/2014 Laperdon ............... G10L 25/63
704/270
2017/0372725 A1* 12/2017 Khoury ................. G10L 25/78

OTHER PUBLICATIONS

P. Indyk and R. Motwani, Approximate Nearest Neighbors: Towards Removing the Curse of Dimensionality. In Proceedings of the Thirtieth Annual ACM Symposium on the Theory of Computing, 1998.

A. Gionis, P. Indyk, and R. Motwani, Similarity Search in High Dimensions via Hashing, in Proc. of 25th International Conference on Very Large Data Bases, 1999, pp. 518-529.

J. He, S. F. Chang, R. Radhakrishnan, and C. Bauer, Compact Hashing with Joint Optimization of Search Accuracy and Time, in IEEE Conference on Computer Vision and Pattern Recognition, Colorado Springs, CO, USA, 2011, pp. 753-760.

B. Kulis and K. Grauman, Kernelized Locality-Sensitive Hashing, IEEE Transactions on Pattern Analysis and Machine Intelligence, 2011.

A. Andoni and P. Indyk, Near-Optimal Hashing Algorithms for Approximate Nearest Neighbor in High Dimensions, Communications of the ACM, vol. 51, No. 1, pp. 117-122, 2008.

S.B. Davis and P. Mermelstein, Comparison of Parametric Representations for Monosyllabic Word Recognition in Continuously Spoken Sentences, in IEEE Transactions on Acoustics, Speech, and Signal Processing, 28(4), pp. 357-366, 1980.

\* cited by examiner

SYSTEM AND METHOD FOR UNSUPERVISED DISCOVERY OF SIMILAR AUDIO EVENTS

BACKGROUND

The present invention generally relates to telecommunications systems and methods, as well as automated dialers. More particularly, the present invention pertains to classification of the call results from an automated dialing campaign.

CROSS REFERENCE TO RELATED APPLICATION

This application claims the benefit of U.S. Provisional Patent Application No. 62/789,860, titled "SYSTEM AND METHOD FOR UNSUPERVISED DISCOVERY OF SIMILAR AUDIO EVENTS", filed in the U.S. Patent and Trademark Office on Jan. 8, 2019, the contents of which are incorporated herein.

SUMMARY

A system and method are presented for unsupervised discovery of similar audio events collected from an automated dialing campaign. Locality Sensitive Hashing (LSH) is used to search for similar audio clips within a large dataset of audio recordings. A database is queried for possible matches between an unknown audio clip and any reference carrier audio message present in the database. The database is updated when new, or changed, carrier audio messages are detected.

In one embodiment, a method is presented for identifying new carrier audio messages, the method comprising the steps of: determining, via a first process, a presence of one or more groups of similar audio recordings within a dataset of audio recordings, wherein each of the one or more groups of similar audio recordings comprises at least a threshold number of the audio recordings having a predetermined level of like characteristic; and labeling each of the one or more groups of similar audio recordings as a one of the new carrier audio messages, wherein the first process comprises the steps of: for each audio recordings in the dataset of audio recordings, separating an associated audio signal into a signaling part and a speech part; segmenting the speech part into frames; computing feature vectors for each of the frames; grouping the feature vectors into overlapping blocks, wherein: each of the overlapping blocks comprises a plurality of the frames; and each of the plurality of frames comprises a plurality of feature vectors; using an algorithm to search the dataset of audio recordings for each of the overlapping blocks, wherein the search comprises: encoding a first one of the overlapping blocks into a binary code, searching the dataset of audio recordings for a hash bucket associated with the binary code, wherein if there is a hash bucket associated with the binary code, identifying the associated hash bucket, and repeating the search until the search is performed for each of the overlapping blocks.

The signaling part comprises a ring tone and the speech part meets a predetermined threshold of length. The feature vectors, which may comprise Mel Frequency Cepstral Coefficients, are invariant to signal degradations. In an embodiment, each of the overlapping blocks contains 10 frames and the 10 frames each contain 13 of the feature vectors. In an embodiment, the threshold number is at least 5 of the audio recordings having the predetermined level of like characteristics. In an embodiment, the algorithm is a locality sensitive hashing algorithm.

The method further comprises a step of creating a new hash bucket if an existing hash bucket associated with the binary code is not found. The method may also comprise the step of adding the binary code to an existing hash bucket in a database.

In another embodiment, a system is presented for identifying new carrier audio messages, the system comprising: a processor; and a memory in communication with the processor, the memory storing instructions that, when executed by the processor, causes the processor to determine a presence of one or more groups of similar audio recordings with a dataset of audio recordings, wherein each of the one or more groups of similar audio recordings comprises at least a threshold number of the audio recordings having a predetermined level of like characteristic, and labeling each of the one or more groups of similar audio recordings as a one of the new carrier audio messages by: for each of the audio recordings in the dataset of audio recordings, separating an associated audio signal into a signaling part and a speech part; segmenting the speech part into frames; computing feature vectors for each of the frames; grouping the feature vectors into overlapping blocks, wherein: each of the overlapping blocks comprises a plurality of the frames; and each of the plurality of frames comprises a plurality of feature vectors; using an algorithm to search the dataset of audio recordings for each of the overlapping blocks, wherein the search comprises: encoding a first one of the overlapping blocks into a binary code, searching the dataset of audio recordings for a hash bucket associated with the binary code, wherein if there is a hash bucket associated with the binary code, identifying the associated hash bucket, and repeating the search until the search is performed for each of the overlapping blocks.

The signaling part comprises a ring tone and the speech part meets a predetermined threshold of length. The feature vectors, which may comprise Mel Frequency Cepstral Coefficients, are invariant to signal degradations. In an embodiment, each of the overlapping blocks contains 10 frames and the 10 frames each contain 13 of the feature vectors. In an embodiment, the threshold number is at least 5 of the audio recordings having the predetermined level of like characteristics. In an embodiment, the algorithm is a locality sensitive hashing algorithm.

The system process further comprises a step of creating a new hash bucket if an existing hash bucket associated with the binary code is not found. The system process may also comprise the step of adding the binary code to an existing hash bucket in a database.

DETAILED DESCRIPTION

Figure 1:
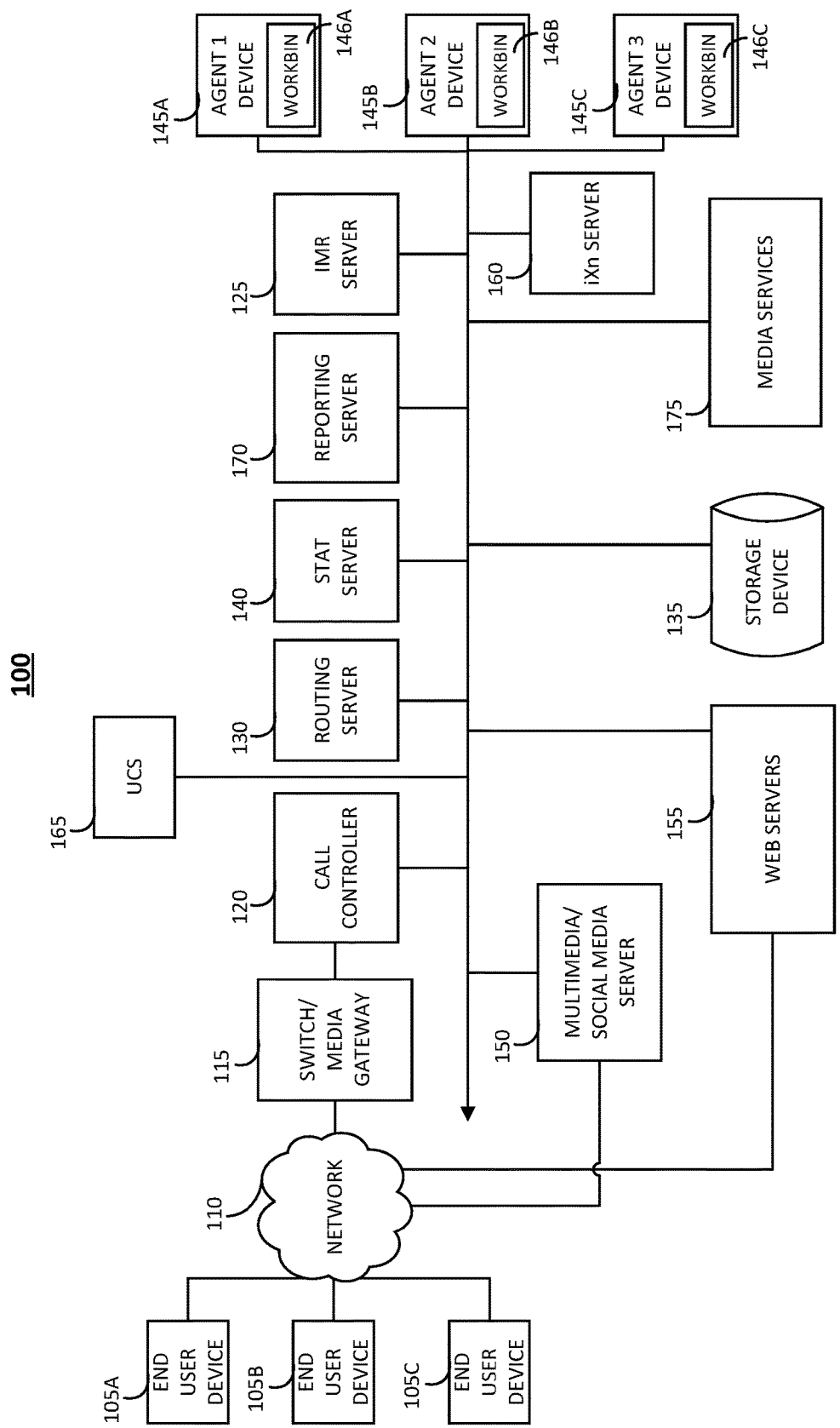
FIG. 1 is a diagram illustrating an embodiment of a communication infrastructure.
Figure 2:
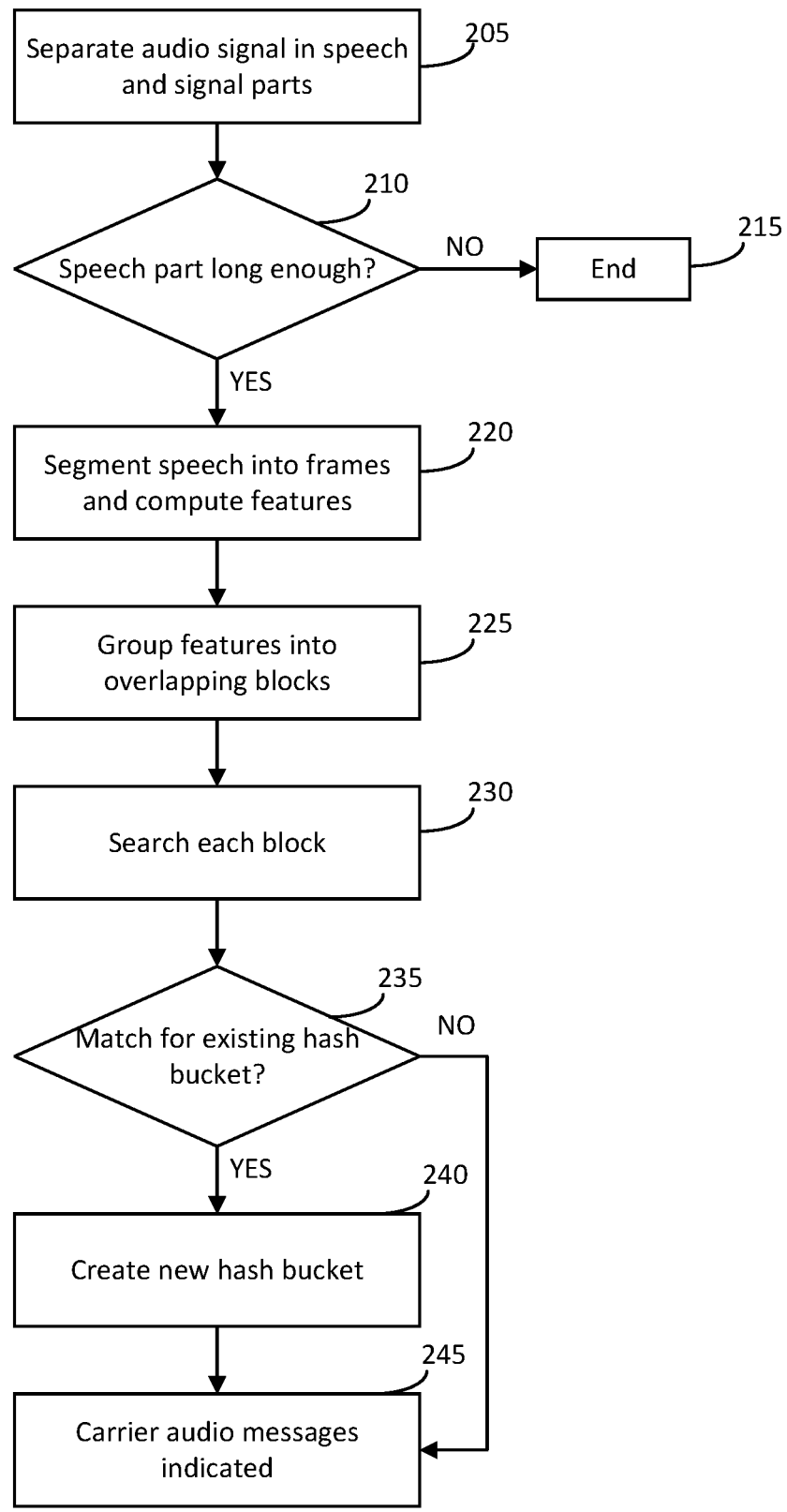
FIG. 2 is a flowchart illustrating an embodiment of a process for discovering similar audio events.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

When an outbound communication, such as a call from an automated dialing campaign conducted by a contact center environment, for example, is being established by an automated application (e.g., an automated dialer) the first interest is generally to know if someone answered, if the line is busy, if it is an answering machine, etc. Call Progress Analysis algorithms are used to automatically classify the call into one of these categories. Carrier audio messages may be used by telephone service providers to predefine the outcome of the call.

Call Analysis, or Call Progress Analysis, comprises a set of signal processing algorithms that work on the audio signal during call setup. The goal is to predict the category of the call (e.g. live speaker, busy, answering machine, etc.) via a series of audio analyzers applied when the call is being established in order to determine how the contact center should handle a connected call.

One of these series of audio analyzers consists of detecting carrier audio messages. An example of a carrier audio message is: We are sorry the person you are trying to reach is not available. The ability to detect automatic messages generated by a telephone service provider plays a key role in Call Progress Analysis; as it allows the system to properly classify and handle the call.

The approach typically employed to discover a new carrier audio message or a changed carrier audio message is to have a human simply listen to a large set of audio recordings, which is highly inefficient and time consuming. An algorithm, such as Locality Sensitive Hashing (LSH), may be used to efficiently search for similar or repetitive audio clips within a large dataset of audio recordings. The recurrence of similar audio events are more likely related carrier audio messages. In an embodiment, this approach can be very useful in the task of unsupervised discovery of new carrier audio messages over a large set of audio recordings and effectively remove the human from having to manually listen to the audio recordings.

Identification of these carrier audio messages is generally carried out using an Audio Fingerprinting Algorithm. An audio fingerprint may be defined as a short summary of an audio object. It is a mapping of an audio object X consisting of many bits to a fingerprint of a few bits via a function F. In the first step, a fingerprint database is created from a known set of carrier audio messages. During the analysis phase, using an unknown audio clip, the database is queried for a possible match between the unknown audio clip and any reference carrier audio message present in the database.

However, the database containing the set of reference fingerprints representing the carrier audio messages also needs to be updated. The carrier audio messages change over time: some new ones are added, some old ones are removed or simply re-recorded using a new voice. When these new carrier audio messages are not detected, the call may not be classified and handled properly during the analysis phase which leads to error and sometimes complaints. Locality Sensitive Hashing (LSH) may be applied to detect repetitions of similar audio events in a large dataset, assuming without loss of generality, that repetitive similar audio clips are more likely carrier audio messages.

Contact Center Systems

FIG. 1 is a diagram illustrating an embodiment of a communication infrastructure, indicated generally at 100. For example, FIG. 1 illustrates a system for supporting a contact center in providing contact center services. The contact center may be an in-house facility to a business or enterprise for serving the enterprise in performing the functions of sales and service relative to the products and services available through the enterprise. In another aspect, the contact center may be operated by a third-party service provider. In an embodiment, the contact center may operate as a hybrid system in which some components of the contact center system are hosted at the contact center premises and other components are hosted remotely (e.g., in a cloud-based environment). The contact center may be deployed on equipment dedicated to the enterprise or third-party service provider, and/or deployed in a remote computing environment such as, for example, a private or public cloud environment with infrastructure for supporting multiple contact centers for multiple enterprises. The various components of the contact center system may also be distributed across various geographic locations and computing environments and not necessarily contained in a single location, computing environment, or even computing device.

Components of the communication infrastructure indicated generally at 100 include: a plurality of end user devices 105A, 105B, 105C; a communications network 110; a switch/media gateway 115; a call controller 120; an IMR server 125; a routing server 130; a storage device 135; a stat server 140; a plurality of agent devices 145A, 145B, 145C comprising workbins 146A, 146B, 146C; a multimedia/social media server 150; web servers 155; an iXn server 160; a UCS 165; a reporting server 170; and media services 175.

In an embodiment, the contact center system manages resources (e.g., personnel, computers, telecommunication equipment, etc.) to enable delivery of services via telephone or other communication mechanisms. Such services may vary depending on the type of contact center and may range from customer service to help desk, emergency response, telemarketing, order taking, etc.

Customers, potential customers, or other end users (collectively referred to as customers or end users) desiring to receive services from the contact center may initiate inbound communications (e.g., telephony calls, emails, chats, etc.) to the contact center via end user devices 105A, 105B, and 105C (collectively referenced as 105). Each of the end user devices 105 may be a communication device conventional in the art, such as a telephone, wireless phone, smart phone, personal computer, electronic tablet, laptop, etc., to name some non-limiting examples. Users operating the end user devices 105 may initiate, manage, and respond to telephone calls, emails, chats, text messages, web-browsing sessions, and other multi-media transactions. While three end user devices 105 are illustrated at 100 for simplicity, any number may be present.

Inbound and outbound communications from and to the end user devices 105 may traverse a network 110 depending on the type of device that is being used. The network 110 may comprise a communication network of telephone, cellular, and/or data services and may also comprise a private or public switched telephone network (PSTN), local area network (LAN), private wide area network (WAN), and/or public WAN such as the Internet, to name a non-limiting example. The network 110 may also include a wireless carrier network including a code division multiple access (CDMA) network, global system for mobile communications (GSM) network, or any wireless network/technology conventional in the art, including but not limited to 3G, 4G, LTE, etc.

In an embodiment, the contact center system includes a switch/media gateway 115 coupled to the network 110 for receiving and transmitting telephony calls between the end users and the contact center. The switch/media gateway 115 may include a telephony switch or communication switch configured to function as a central switch for agent level routing within the center. The switch may be a hardware switching system or a soft switch implemented via software. For example, the switch 115 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, an agent telephony or communication device. In this example, the switch/media gateway establishes a voice path/connection (not shown) between the calling customer and the agent telephony device, by establishing, for example, a connection between the customer's telephony device and the agent telephony device.

In an embodiment, the switch is coupled to a call controller 120 which may, for example, serve as an adapter or interface between the switch and the remainder of the routing, monitoring, and other communication-handling components of the contact center. The call controller 120 may be configured to process PSTN calls, VoIP calls, etc. For example, the call controller 120 may be configured with computer-telephony integration (CTI) software for interfacing with the switch/media gateway and contact center equipment. In an embodiment, the call controller 120 may include a session initiation protocol (SIP) server for processing SIP calls. The call controller 120 may also extract data about the customer interaction, such as the caller's telephone number (e.g., the automatic number identification (ANI) number), the customer's internet protocol (IP) address, or email address, and communicate with other components of the system 100 in processing the interaction.

In an embodiment, the system 100 further includes an interactive media response (IMR) server 125. The IMR server 125 may also be referred to as a self-help system, a virtual assistant, etc. The IMR server 125 may be similar to an interactive voice response (IVR) server, except that the IMR server 125 is not restricted to voice and additionally may cover a variety of media channels. In an example illustrating voice, the IMR server 125 may be configured with an IMR script for querying customers on their needs. For example, a contact center for a bank may tell customers via the IMR script to 'press 1' if they wish to retrieve their account balance. Through continued interaction with the IMR server 125, customers may be able to complete service without needing to speak with an agent. The IMR server 125 may also ask an open-ended question such as, "How can I help you?" and the customer may speak or otherwise enter a reason for contacting the contact center. The customer's response may be used by a routing server 130 to route the call or communication to an appropriate contact center resource.

If the communication is to be routed to an agent, the call controller 120 interacts with the routing server (also referred to as an orchestration server) 130 to find an appropriate agent for processing the interaction. The selection of an appropriate agent for routing an inbound interaction may be based, for example, on a routing strategy employed by the routing server 130, and further based on information about agent availability, skills, and other routing parameters provided, for example, by a statistics server 140.

In an embodiment, the routing server 130 may query a customer database, which stores information about existing clients, such as contact information, service level agreement (SLA) requirements, nature of previous customer contacts and actions taken by the contact center to resolve any customer issues, etc. The database may be, for example, Cassandra or any NoSQL database, and may be stored in a mass storage device 135. The database may also be a SQL database and may be managed by any database management system such as, for example, Oracle, IBM DB2, Microsoft SQL server, Microsoft Access, PostgreSQL, etc., to name a few non-limiting examples. The routing server 130 may query the customer information from the customer database via an ANI or any other information collected by the IMR server 125.

Once an appropriate agent is identified as being available to handle a communication, a connection may be made between the customer and an agent device 145A, 145B and/or 145C (collectively referenced as 145) of the identified agent. While three agent devices are illustrated in FIG. 1 for simplicity, any number of devices may be present. Collected information about the customer and/or the customer's historical information may also be provided to the agent device for aiding the agent in better servicing the communication and additionally to the contact center admin/supervisor device for managing the contact center. In this regard, each device 145 may include a telephone adapted for regular telephone calls, VoIP calls, etc. The device 145 may also include a computer for communicating with one or more servers of the contact center and performing data processing associated with contact center operations, and for interfacing with customers via voice and other multimedia communication mechanisms.

The contact center system 100 may also include a multimedia/social media server 150 for engaging in media interactions other than voice interactions with the end user devices 105 and/or web servers 155. The media interactions may be related, for example, to email, vmail (voice mail through email), chat, video, text-messaging, web, social media, co-browsing, etc. The multi-media/social media server 150 may take the form of any IP router conventional in the art with specialized hardware and software for receiving, processing, and forwarding multi-media events.

The web servers 155 may include, for example, social interaction site hosts for a variety of known social interaction sites to which an end user may subscribe, such as Facebook, Twitter, Instagram, etc., to name a few non-limiting examples. In an embodiment, although web servers 155 are depicted as part of the contact center system 100, the web servers may also be provided by third parties and/or maintained outside of the contact center premise. The web servers 155 may also provide web pages for the enterprise that is being supported by the contact center system 100. End users may browse the web pages and get information about the enterprise's products and services. The web pages may also provide a mechanism for contacting the contact center via, for example, web chat, voice call, email, web real-time communication (WebRTC), etc. Widgets may be deployed on the websites hosted on the web servers 155.

In an embodiment, deferrable interactions/activities may also be routed to the contact center agents in addition to real-time interactions. Deferrable interaction/activities may comprise back-office work or work that may be performed off-line such as responding to emails, letters, attending training, or other activities that do not entail real-time communication with a customer. An interaction (iXn) server 160 interacts with the routing server 130 for selecting an appropriate agent to handle the activity. Once assigned to an agent, an activity may be pushed to the agent, or may appear in the agent's workbin 146A, 146B, 146C (collectively 146) as a task to be completed by the agent. The agent's workbin may be implemented via any data structure conventional in the art, such as, for example, a linked list, array, etc. In an embodiment, a workbin 146 may be maintained, for example, in buffer memory of each agent device 145.

In an embodiment, the mass storage device(s) 135 may store one or more databases relating to agent data (e.g., agent profiles, schedules, etc.), customer data (e.g., customer profiles), interaction data (e.g., details of each interaction with a customer, including, but not limited to: reason for the interaction, disposition data, wait time, handle time, etc.), and the like. In another embodiment, some of the data (e.g., customer profile data) may be maintained in a customer relations management (CRM) database hosted in the mass storage device 135 or elsewhere. The mass storage device 135 may take form of a hard disk or disk array as is conventional in the art.

In an embodiment, the contact center system may include a universal contact server (UCS) 165, configured to retrieve information stored in the CRM database and direct information to be stored in the CRM database. The UCS 165 may also be configured to facilitate maintaining a history of customers' preferences and interaction history, and to capture and store data regarding comments from agents, customer communication history, etc.

The contact center system may also include a reporting server 170 configured to generate reports from data aggregated by the statistics server 140. Such reports may include near real-time reports or historical reports concerning the state of resources, such as, for example, average wait time, abandonment rate, agent occupancy, etc. The reports may be generated automatically or in response to specific requests from a requestor (e.g., agent/administrator, contact center application, etc.).

The various servers of FIG. 1 may each include one or more processors executing computer program instructions and interacting with other system components for performing the various functionalities described herein. The computer program instructions are stored in a memory implemented using a standard memory device, such as for example, a random-access memory (RAM). The computer program instructions may also be stored in other non-transitory computer readable media such as, for example, a CD-ROM, flash drive, etc. Although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

In an embodiment, the terms "interaction" and "communication" are used interchangeably, and generally refer to any real-time and non-real-time interaction that uses any communication channel including, without limitation, telephony calls (PSTN or VoIP calls), emails, vmails, video, chat, screen-sharing, text messages, social media messages, WebRTC calls, etc.

The media services 175 may provide audio and/or video services to support contact center features such as prompts for an IVR or IMR system (e.g., playback of audio files), hold music, voicemails/single party recordings, multi-party recordings (e.g., of audio and/or video calls), speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, and keyword spotting.

In an embodiment, the premises-based platform product may provide access to and control of components of the system 100 through user interfaces (UIs) present on the agent devices 145A-C. Within the premises-based platform product, the graphical application generator program may be integrated which allows a user to write the programs (handlers) that control various interaction processing behaviors within the premises-based platform product.

As noted above, the contact center may operate as a hybrid system in which some or all components are hosted remotely, such as in a cloud-based environment. For the sake of convenience, aspects of embodiments of the present invention will be described below with respect to providing modular tools from a cloud-based environment to components housed on-premises.

Locality Sensitive Hashing

Exact duplicate elements in a data set can be found using a hash table. However, if the goal is to find elements that are almost similar the problem becomes relatively complex. Because different phone calls are generally carried out over different transmission channels via the communication infrastructure 100 (FIG. 1), often with different encoding and decoding schemes, the repetitive audio events need to be detected are rarely exact duplicates of one another. In an embodiment, the Approximate Nearest Neighbor search algorithm may be applied. In an embodiment, the method consists of generating binary codes for high dimensional data points while preserving the similarity among the original vectors. The process can be described as follows:

A hashing algorithm partitions the original feature space into two parts. The points in one part receive a code bit 1 and the points in the other part receive a code bit 0. When l partitions are used, the hashing algorithm generates l-bits code for each point. The feature space is then portioned into $2^l$ parts that are referred to as hash buckets. Generally, similar or neighboring vectors fall into the same bucket or the nearby bucket. Each hash bucket is associated with a binary code which is used as a hashing index at search time. One of the most popular hashing algorithmic techniques is Locality Sensitive Hashing (LSH), which uses random projection to partition the feature space. Generally, LSH constructs hash functions g: $R^d \to U$ (where g represents the hash function, U represents a universe of items, $R^d$ represents the dimensional space and d represents a dimension) such that for any points p, q:

If $\|p-p\| \le r$, then Prob[g(p)=g(q)] is high. The threshold parameter is r>0.

If $\|p-q\| > cr$, then Prob[g(p)=g(q)] is small. With cr>r, where c represents an approximation factor.

The hash function g can be a simple linear projection onto $R^1$ defined as:

$$g_{x,b}(p) = \frac{(pX + b)}{w},$$

where $X=(x_1 \ldots x_d)$ is a random projection vector, b is a scalar, and w=r is the upper bound of the distance between p and q.

Given a set of points P in $R^d$, we define the Nearest Neighbor as: for a query q returns a point p∈P that minimizes ‖p−q‖. The r-Near Neighbor may be defined as follows: for a query q returns points p∈P for which ‖p−q‖<r. The Nearest Neighbor is a form of proximity search for finding a point in a given set closest or most similar to a given point.

In a set of audio recordings, it is assumed that the audio recordings comprise carrier audio messages and that these messages appear more than once in the dataset. Automated dialers, in general, do not call the same number multiple times. The LSH algorithm is used to detect these repetitive carrier audio messages. For each audio recording in the dataset, the following steps are performed.

In operation 205, the audio signal is separated into two parts: the signaling part (ring tone in general) and the speech part. Control is passed to operation 210 and the process 200 continues.

In operation 210, it is determined whether the speech part is long enough to continue the process. If it is determined that the speech part is not long enough, the process ends for that audio signal 215 and a next audio signal may be processed, beginning the process 200 anew. If it is determined that the speech part is long enough, control is passed to operation 220 and the process 200 continues. The speech part needs to be long enough to be considered as a possible carrier audio message.

In operation 220, the speech part is segmented into frames. A set of features is computed for each frame. The features are chosen such that they are invariant (up to some degree) to signal degradations. Mel Frequency Cepstral Coefficients (MFCC) may be used as the feature vector. Control is passed to operation 225 and the process 200 continues.

In operation 225, the MFCCs are grouped into blocks. In an embodiment, the blocks are overlapping to increase the system's robustness. A block comprises a number of frames and each frame comprises a number of feature vectors. In an embodiment, a block comprises ten frames and each frame further comprises thirteen MFCCs. Therefore, each input vector, or query point p, contains 130 elements for this example. Control is passed to operation 230 and the process 200 continues.

In operation 230, each block is searched. For example, the LSH is used to perform a search with a Hashing Index for each block as described above. The query point p is encoded into a binary code. The search tries to find if there is a hash bucket associated to this binary code. If a hash bucket for this binary code exists, then a linear scan within the k points in the hash bucket and the query point p is performed to find the closest match (assume that it is point q). The counter of the audio event M to which q belongs is increased. The query continues until all the points p have been processed. Control passes to operation 235 and the process 200 continues.

In operation 235, it is determined whether a new audio message not matching an existing hash bucket has been found. If one has, a new hash buckets may be created 240 or it may be added to a closely matching existing hash bucket. Otherwise, the process continues to operation 245. For example, it may be assumed that the current audio file contains a total of N points p. If n of the N points, where $$\frac{n}{N} > 0.85,$$

match points q of the same audio event M, then it is assumed that the current audio file is a repetition of an already seen audio event M. Otherwise, it is assumed that the current audio message has not been seen before and its N set of points, using their binary code, are simply added to the proper hash buckets that already exist, or new hash buckets are simply created if the binary code of certain points do not match any existing hash bucket.

In operation 250, an audio event that appears more than T times (e.g., T=5) is declared and indicated as a carrier audio message, where T is a threshold number. In an embodiment, T=5 is indicative of a carrier audio message. The process 200 ends.

Computer Systems

In an embodiment, each of the various servers, controls, switches, gateways, engines, and/or modules (collectively referred to as servers) in the described figures are implemented via hardware or firmware (e.g., ASIC) as will be appreciated by a person of skill in the art. Each of the various servers may be a process or thread, running on one or more processors, in one or more computing devices (e.g., FIGS. 3A, 3B), executing computer program instructions and interacting with other system components for performing the various functionalities described herein. The computer program instructions are stored in a memory which may be implemented in a computing device using a standard memory device, such as, for example, a RAM. The computer program instructions may also be stored in other non-transitory computer readable media such as, for example, a CD-ROM, a flash drive, etc. A person of skill in the art should recognize that a computing device may be implemented via firmware (e.g., an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JSON.

Figure 3A:
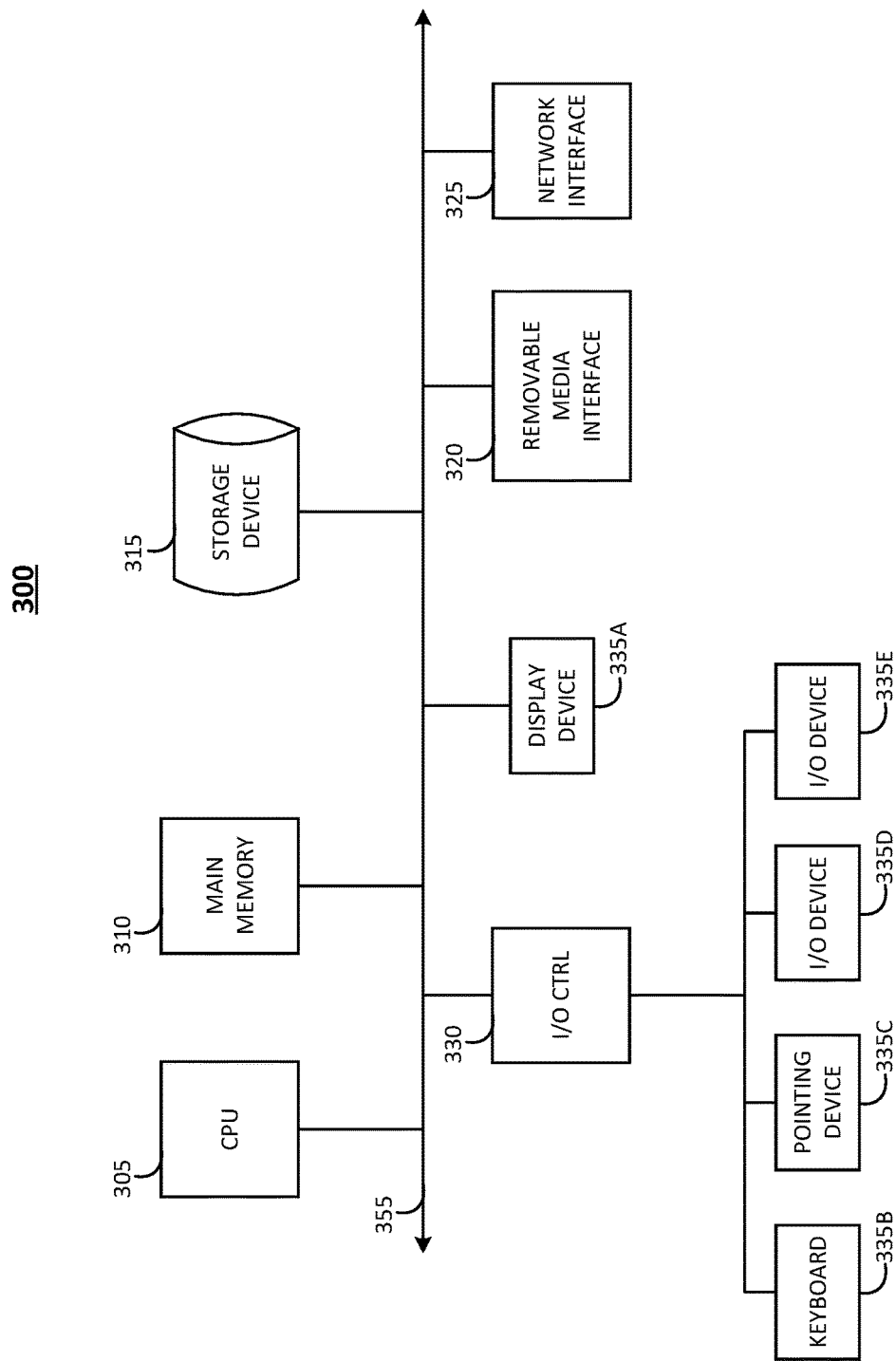
FIG. 3A is a diagram illustrating an embodiment of a computing device.
Figure 3B:
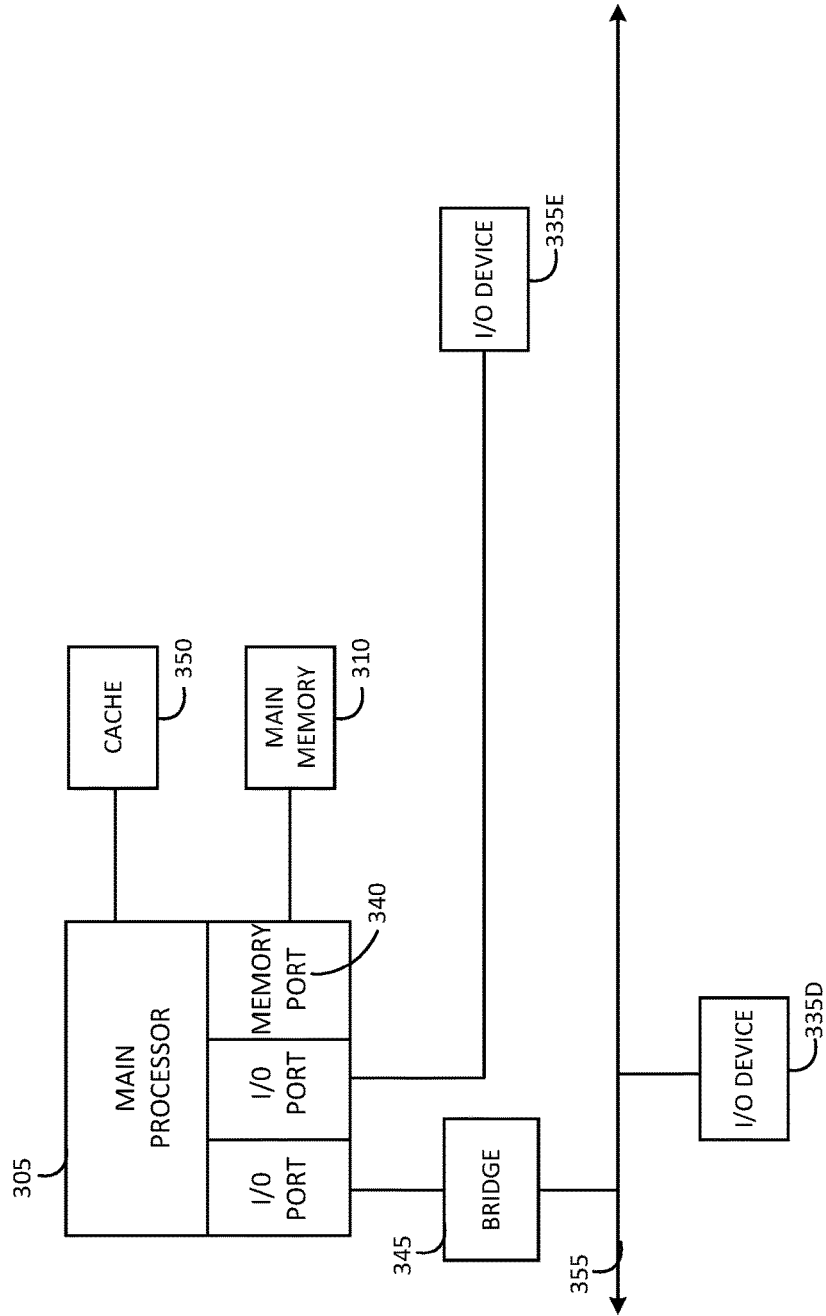
FIG. 3B is a diagram illustrating an embodiment of a computing device.

FIGS. 3A and 3B are diagrams illustrating an embodiment of a computing device as may be employed in an embodiment of the invention, indicated generally at 300. Each computing device 300 includes a CPU 305 and a main memory unit 310. As illustrated in FIG. 3A, the computing device 300 may also include a storage device 315, a removable media interface 320, a network interface 325, an input/output (I/O) controller 330, one or more display devices 335A, a keyboard 335B and a pointing device 335C (e.g., a mouse). The storage device 315 may include, without limitation, storage for an operating system and software. As shown in FIG. 3B, each computing device 300 may also include additional optional elements, such as a memory port 340, a bridge 345, one or more additional input/output devices 335D, 335E, and a cache memory 350 in communication with the CPU 305. The input/output devices 335A, 335B, 335C, 335D, and 335E may collectively be referred to herein as 335.

The CPU 305 is any logic circuitry that responds to and processes instructions fetched from the main memory unit 310. It may be implemented, for example, in an integrated circuit, in the form of a microprocessor, microcontroller, or graphics processing unit, or in a field-programmable gate array (FPGA) or application-specific integrated circuit (ASIC). The main memory unit 310 may be one or more memory chips capable of storing data and allowing any storage location to be directly accessed by the central processing unit 305. As shown in FIG. 3A, the central processing unit 305 communicates with the main memory 310 via a system bus 355. As shown in FIG. 3B, the central processing unit 305 may also communicate directly with the main memory 310 via a memory port 340.

In an embodiment, the CPU 305 may include a plurality of processors and may provide functionality for simultaneous execution of instructions or for simultaneous execution of one instruction on more than one piece of data. In an embodiment, the computing device 300 may include a parallel processor with one or more cores. In an embodiment, the computing device 300 comprises a shared memory parallel device, with multiple processors and/or multiple processor cores, accessing all available memory as a single global address space. In another embodiment, the computing device 300 is a distributed memory parallel device with multiple processors each accessing local memory only. The computing device 300 may have both some memory which is shared and some which may only be accessed by particular processors or subsets of processors. The CPU 305 may include a multicore microprocessor, which combines two or more independent processors into a single package, e.g., into a single integrated circuit (IC). For example, the computing device 300 may include at least one CPU 305 and at least one graphics processing unit.

In an embodiment, a CPU 305 provides single instruction multiple data (SIMD) functionality, e.g., execution of a single instruction simultaneously on multiple pieces of data. In another embodiment, several processors in the CPU 305 may provide functionality for execution of multiple instructions simultaneously on multiple pieces of data (MIMD). The CPU 305 may also use any combination of SIMD and MIMD cores in a single device.

FIG. 3B depicts an embodiment in which the CPU 305 communicates directly with cache memory 350 via a secondary bus, sometimes referred to as a backside bus. In other embodiments, the CPU 305 communicates with the cache memory 350 using the system bus 355. The cache memory 350 typically has a faster response time than main memory 310. As illustrated in FIG. 3A, the CPU 305 communicates with various I/O devices 335 via the local system bus 355. Various buses may be used as the local system bus 355, including, but not limited to, a Video Electronics Standards Association (VESA) Local bus (VLB), an Industry Standard Architecture (ISA) bus, an Extended Industry Standard Architecture (EISA) bus, a Micro Channel Architecture (MCA) bus, a Peripheral Component Interconnect (PCI) bus, a PCI Extended (PCI-X) bus, a PCI-Express bus, or a NuBus. For embodiments in which an I/O device is a display device 335A, the CPU 305 may communicate with the display device 335A through an Advanced Graphics Port (AGP). FIG. 3B depicts an embodiment of a computer 300 in which the CPU 305 communicates directly with I/O device 335E. FIG. 3B also depicts an embodiment in which local buses and direct communication are mixed: the CPU 305 communicates with I/O device 335D using a local system bus 355 while communicating with I/O device 335E directly.

A wide variety of I/O devices 335 may be present in the computing device 300. Input devices include one or more keyboards 335B, mice, trackpads, trackballs, microphones, and drawing tables, to name a few non-limiting examples. Output devices include video display devices 335A, speakers and printers. An I/O controller 330 as shown in FIG. 3A, may control the one or more I/O devices, such as a keyboard 335B and a pointing device 335C (e.g., a mouse or optical pen), for example.

Referring again to FIG. 3A, the computing device 300 may support one or more removable media interfaces 320, such as a floppy disk drive, a CD-ROM drive, a DVD-ROM drive, tape drives of various formats, a USB port, a Secure Digital or COMPACT FLASH' memory card port, or any other device suitable for reading data from read-only media, or for reading data from, or writing data to, read-write media. An I/O device 335 may be a bridge between the system bus 355 and a removable media interface 320.

The removable media interface 320 may, for example, be used for installing software and programs. The computing device 300 may further include a storage device 315, such as one or more hard disk drives or hard disk drive arrays, for storing an operating system and other related software, and for storing application software programs. Optionally, a removable media interface 320 may also be used as the storage device. For example, the operating system and the software may be run from a bootable medium, for example, a bootable CD.

In an embodiment, the computing device 300 may include or be connected to multiple display devices 335A, which each may be of the same or different type and/or form. As such, any of the I/O devices 335 and/or the I/O controller 330 may include any type and/or form of suitable hardware, software, or combination of hardware and software to support, enable or provide for the connection to, and use of, multiple display devices 335A by the computing device 300. For example, the computing device 300 may include any type and/or form of video adapter, video card, driver, and/or library to interface, communicate, connect or otherwise use the display devices 335A. In an embodiment, a video adapter may include multiple connectors to interface to multiple display devices 335A. In another embodiment, the computing device 300 may include multiple video adapters, with each video adapter connected to one or more of the display devices 335A. In other embodiments, one or more of the display devices 335A may be provided by one or more other computing devices, connected, for example, to the computing device 300 via a network. These embodiments may include any type of software designed and constructed to use the display device of another computing device as a second display device 335A for the computing device 300. One of ordinary skill in the art will recognize and appreciate the various ways and embodiments that a computing device 300 may be configured to have multiple display devices 335A.

An embodiment of a computing device indicated generally in FIGS. 3A and 3B may operate under the control of an operating system, which controls scheduling of tasks and access to system resources. The computing device 300 may be running any operating system, any embedded operating system, any real-time operating system, any open source operation system, any proprietary operating system, any operating systems for mobile computing devices, or any other operating system capable of running on the computing device and performing the operations described herein.

The computing device 300 may be any workstation, desktop computer, laptop or notebook computer, server machine, handled computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 300 may have different processors, operating systems, and input devices consistent with the device.

In other embodiments, the computing device 300 is a mobile device. Examples might include a Java-enabled cellular telephone or personal digital assistant (PDA), a smart phone, a digital audio player, or a portable media player. In an embodiment, the computing device 300 includes a combination of devices, such as a mobile phone combined with a digital audio player or portable media player.

A computing device 300 may be one of a plurality of machines connected by a network, or it may include a plurality of machines so connected. A network environment may include one or more local machine(s), client(s), client node(s), client machine(s), client computer(s), client device(s), endpoint(s), or endpoint node(s) in communication with one or more remote machines (which may also be generally referred to as server machines or remote machines) via one or more networks. In an embodiment, a local machine has the capacity to function as both a client node seeking access to resources provided by a server machine and as a server machine providing access to hosted resources for other clients. The network may be LAN or WAN links, broadband connections, wireless connections, or a combination of any or all of the above. Connections may be established using a variety of communication protocols. In one embodiment, the computing device 300 communicates with other computing devices 300 via any type and/or form of gateway or tunneling protocol such as Secure Socket Layer (SSL) or Transport Layer Security (TLS). The network interface may include a built-in network adapter, such as a network interface card, suitable for interfacing the computing device to any type of network capable of communication and performing the operations described herein. An I/O device may be a bridge between the system bus and an external communication bus.

In an embodiment, a network environment may be a virtual network environment where the various components of the network are virtualized. For example, the various machines may be virtual machines implemented as a software-based computer running on a physical machine. The virtual machines may share the same operating system. In other embodiments, different operating system may be run on each virtual machine instance. In an embodiment, a "hypervisor" type of virtualizing is implemented where multiple virtual machines run on the same host physical machine, each acting as if it has its own dedicated box. The virtual machines may also run on different host physical machines.

Other types of virtualization are also contemplated, such as, for example, the network (e.g., via Software Defined Networking (SDN)). Functions, such as functions of session border controller and other types of functions, may also be virtualized, such as, for example, via Network Functions Virtualization (NFV).

In an embodiment, the use of LSH to automatically discover carrier audio messages in a large set of pre-connected audio recordings may be applied in the support process of media services for a contact center environment. For example, this can assist with the call analysis process for a contact center and removes the need to have humans listen to a large set of audio recordings to discover new carrier audio messages.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the invention as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

The invention claimed is:

1. A method for identifying new carrier audio messages, the method comprising the steps of:
   determining, via a first process, a presence of one or more groups of similar audio recordings within a dataset of audio recordings, wherein each of the one or more groups of similar audio recordings comprises at least a threshold number of the audio recordings having a predetermined level of like characteristic; and
   labeling each of the one or more groups of similar audio recordings as a one of the new carrier audio messages;
   wherein the first process comprises the steps of:
      for each of the audio recordings in the dataset of audio recordings, separating an associated audio signal into a signaling part and a speech part;
      segmenting the speech part into frames;
      computing feature vectors for each of the frames;
      grouping the feature vectors into overlapping blocks, wherein:
         each of the overlapping blocks comprises a plurality of the frames; and
         each of the plurality of frames comprises a plurality of feature vectors;
      using an algorithm to search the dataset of audio recordings for each of the overlapping blocks, wherein the search comprises:
         encoding a first one of the overlapping blocks into a binary code,
         searching the dataset of audio recordings for a hash bucket associated with the binary code, wherein if there is a hash bucket associated with the binary code, identifying the associated hash bucket, and repeating the search until the search is performed for each of the overlapping blocks.

2. The method of claim 1, wherein the signaling part comprises a ring tone and the speech part meets a predetermined threshold of length.

3. The method of claim 1, wherein the feature vectors are invariant to signal degradations.

4. The method of claim 3, wherein the feature vectors comprise Mel Frequency Cepstral Coefficients.

5. The method of claim 1, wherein each of the overlapping blocks contains 10 of the frames, and the 10 of the frames each contain 13 of the feature vectors.

6. The method of claim 1, wherein the each of the one or more groups of similar audio recordings comprises at least 5 of the audio recordings having the predetermined level of like characteristics.

7. The method of claim 1, wherein the algorithm is a locality sensitive hashing algorithm.

8. The method of claim 1, wherein the method further comprises the step of adding the binary code to an existing hash bucket in a database.

9. The method of claim 1, wherein the method further comprises the step of creating a new hash bucket if an existing hash bucket associated with the binary code is not found.

10. A system for identifying new carrier audio messages, the system comprising:
a processor; and
a memory in communication with the processor, the memory storing instructions that, when executed by the processor, causes the processor to determine a presence of one or more groups of similar audio recordings with a dataset of audio recordings, wherein each of the one or more groups of similar audio recordings comprises at least a threshold number of the audio recordings having a predetermined level of like characteristic, and labeling each of the one or more groups of similar audio recordings as a one of the new carrier audio messages by:
for each of the audio recordings in the dataset of audio recordings, separating an associated audio signal into a signaling part and a speech part;
segmenting the speech part into frames;
computing feature vectors for each of the frames;
grouping the feature vectors into overlapping blocks, wherein:
each of the overlapping blocks comprises a plurality of the frames; and
each of the plurality of frames comprises a plurality of feature vectors;
using an algorithm to search the dataset of audio recordings for each of the overlapping blocks, wherein the search comprises:
encoding a first one of the overlapping blocks into a binary code,
searching the dataset of audio recordings for a hash bucket associated with the binary code, wherein if there is a hash bucket associated with the binary code, identifying the associated hash bucket, and
repeating the search until the search is performed for each of the overlapping blocks.

11. The system of claim 10, wherein the signaling part comprises a ring tone and the speech part meets a predetermined threshold of length.

12. The system of claim 10, wherein the feature vectors are invariant to signal degradations.

13. The system of claim 12, wherein the feature vectors comprise Mel Frequency Cepstral Coefficients.

14. The system of claim 10, wherein each of the overlapping blocks contains 10 of the frames, and the 10 of the frames each contain 13 of the feature vectors.

15. The system of claim 10, wherein the each of the one or more groups of similar audio recordings comprises at least 5 of the audio recordings having the predetermined level of like characteristics.

16. The system of claim 10, wherein the algorithm is a locality sensitive hashing algorithm.

17. The system of claim 10, wherein the process further comprises adding the binary code to an existing hash bucket in a database.

18. The system of claim 10, wherein the process further comprises creating a new hash bucket if an existing hash bucket associated with the binary code is not found.

* * * * *